United States Patent
Watadani et al.

(10) Patent No.: US 7,688,549 B2
(45) Date of Patent: Mar. 30, 2010

(54) HEAD SUSPENSION

(75) Inventors: Eiji Watadani, Aikoh-gun (JP); Masao Hanya, Aikoh-gun (JP)

(73) Assignee: NHK Spring Co., Ltd., Yokohama (JP)

( * ) Notice: Subject to any disclaimer, the term of this patent is extended or adjusted under 35 U.S.C. 154(b) by 861 days.

(21) Appl. No.: 11/393,138

(22) Filed: Mar. 29, 2006

(65) Prior Publication Data

US 2006/0221503 A1 Oct. 5, 2006

(30) Foreign Application Priority Data

Mar. 31, 2005 (JP) ............................. 2005-104505

(51) Int. Cl.
*G11B 5/48* (2006.01)
*G11B 21/21* (2006.01)

(52) U.S. Cl. ............... 360/244.5; 360/244.8; 360/245.4

(58) Field of Classification Search .... 360/244.2–245.7
See application file for complete search history.

(56) References Cited

U.S. PATENT DOCUMENTS

| | | | | |
|---|---|---|---|---|
| 5,796,554 | A * | 8/1998 | Berding et al. | 360/244.8 |
| 5,892,637 | A | 4/1999 | Brooks, Jr. et al. | |
| 6,288,877 | B1 * | 9/2001 | Khan et al. | 360/245.9 |
| 6,360,427 | B1 * | 3/2002 | Takasugi | 29/603.06 |
| 6,765,759 | B2 | 7/2004 | Bhattacharya et al. | |
| 6,798,618 | B2 | 9/2004 | Takagi et al. | |
| 6,920,017 | B2 * | 7/2005 | Saito et al. | 360/244.2 |
| 6,965,501 | B1 * | 11/2005 | Pan et al. | 360/245.7 |
| 6,967,819 | B1 * | 11/2005 | Wolter et al. | 360/244.1 |
| 7,088,554 | B2 | 8/2006 | Nojima | |
| 7,088,558 | B2 | 8/2006 | Takagi et al. | |
| 7,207,097 | B2 * | 4/2007 | Detjens et al. | 29/603.06 |
| 7,224,555 | B2 * | 5/2007 | Ando et al. | 360/244.8 |
| 7,365,945 | B2 | 4/2008 | Fujimoto et al. | |
| 2003/0161073 | A1 * | 8/2003 | Horie et al. | 360/244.2 |
| 2003/0179501 | A1 | 9/2003 | Takagi et al. | |
| 2004/0061975 | A1 | 4/2004 | Boutaghou et al. | |
| 2004/0150919 | A1 * | 8/2004 | Saito et al. | 360/244.2 |
| 2004/0207958 | A1 * | 10/2004 | Hashi et al. | 360/244.2 |

(Continued)

FOREIGN PATENT DOCUMENTS

CN 1393851 1/2003

(Continued)

*Primary Examiner*—William J Klimowicz
(74) *Attorney, Agent, or Firm*—Jordan and Hamburg LLP

(57) ABSTRACT

A head suspension for a hard disk drive is thin from an arm to a head and involves a minimum step between the arm and a load beam. The head suspension includes a load beam that includes a rigid part and a resilient part. The load beam applies load onto a head that is arranged at a front end of the load beam to write and read data to and from a disk arranged in the hard disk drive. The head is connected to read/write wiring patterns of a flexure. The flexure supports the head and is attached to a disk-facing surface of the rigid part. An arm is attached to a carriage of the hard disk drive and is turned around a spindle. The arm supports the resilient part that is attached to a base end of the rigid part. A disk-facing surface of the arm is arranged within the total of thicknesses of the rigid part and head.

22 Claims, 5 Drawing Sheets

U.S. PATENT DOCUMENTS

| | | |
|---|---|---|
| 2004/0240114 A1* | 12/2004 | Takikawa et al. ......... 360/244.8 |
| 2005/0030670 A1* | 2/2005 | Ando et al. ............. 360/244.8 |
| 2006/0221504 A1 | 10/2006 | Hanya et al. |
| 2007/0041130 A1 | 2/2007 | Hanya et al. |

FOREIGN PATENT DOCUMENTS

| | | |
|---|---|---|
| JP | 63-58372 | 4/1988 |
| JP | 9-282624 | 10/1997 |
| JP | 11-514780 | 12/1999 |
| JP | 2002-203383 | 7/2002 |
| JP | 2005-166203 | 6/2005 |

* cited by examiner

Fig.14

|  | Combinational bending elastic modulus | Bending elastic modulus of resilient part | Flexure contribution rate |
| --- | --- | --- | --- |
|  | (gf/mm) | (gf/mm) | (%) |
| Related art | 2.280 | 1.495 | 34.4 |
| First Embodiment | 1.649 | 1.495 | 9.3 |
| Second Embodiment | 1.143 | 1.041 | 8.9 |
| Third Embodiment | 1.581 | 1.484 | 6.1 |
| Fourth Embodiment | 1.574 | 1.483 | 5.8 |
| Fifth Embodiment | 1.685 | 1.495 | 11.3 |
| Sixth Embodiment | 1.621 | 1.495 | 7.8 |

HEAD SUSPENSION

BACKGROUND OF THE INVENTION

1. Field of the Invention

The present invention relates to a head suspension for a hard disk drive incorporated in an image processing unit such as a computer.

2. Description of Related Art

FIG. 1 shows part of a hard disk drive. The hard disk drive includes disks 2 serving as storage media. Data is written to and read from the disk 2 with a magnetic head 11 that is supported with a head suspension 101. The head suspension 101 is attached to an arm 31. The arm 31 is attached to a carriage 13, which is turned around a spindle (not shown) by a positioning motor (not shown). The head suspension 101 includes a base plate 32, a load beam 102 extending from the base plate 32 to the head 11, and a flexure 103.

The load beam 102 is made of, for example, a stainless steel (Japanese Industrial Standard: SUS304, SUS301, or the like) plate having a thickness in the range of 30 μm to 60 μm. The flexure 103 includes a substrate made of a stainless steel (SUS304) plate or a spring plate having a thickness of about 20 μm, an insulating layer formed on the substrate from, for example, polyimide resin, and a conductive layer made of, for example, copper by deposition or photolithography on the insulating layer. On the conductive layer, a protective layer is usually made from insulating material such as polyimide or epoxy resin. The total thickness of the flexure 103 is about 40 μm.

The arm 31 and base plate 32 are usually discrete parts. There is an integrated arm (called "unamount arm") that is an integration of an arm and a base plate. The arm and base plate are collectively called "base" (12) hereinafter. The base plate 32 has a thickness of 200 μm to 300 μm. The bending elastic modulus of the base plate 32 is larger than that of the load beam 102 by one digit.

The load beam 102 includes a rigid part 21, a resilient part 22, and a joint part 105. The resilient part 22 is bent by a predetermined amount toward the disk 2, to apply a gram load onto the head 11 so that the head is pressed against the disk 2. The joint part 105 of the load beam 102 is laid on and fixed to a surface of the base 12. The flexure 103 transmits data to and from the head 11. Between the head 11 and the joint part 105 of the load beam 102, the flexure 103 is laser-welded at several spots to a surface of the load beam 102 that faces the disk 2.

The head 11 lifts from the surface of the disk 2 due to an air flow when the disk 2 is rotated. It is preferable that a force to lift the head 11 balances with the gram load of the head suspension 101 so that the head 11 is stably kept at a slightly lifted position. For this, adjusting the gram load by bending the load beam 102 is essential to determine the performance of the hard disk drive. If the gram load is determined solely with the bending stress of the resilient part 22 of the load beam 102, the designing of the head suspension 101 will be easy.

In practice, however, the bending stress of a combination of the resilient part 22 of the load beam 102 and the flexure 103 arranged in parallel with the resilient part 22 works on the head suspension 101. FIG. 2 is a perspective view showing an example of a head suspension 101 according to a related art. Like the head suspension 101 of FIG. 1, the head suspension 101 of FIG. 2 includes a load beam 102, a flexure 103, and a base plate 32 serving as a base 12. The load beam 102 includes a rigid part 21, a resilient part 22, and a joint part 105. FIG. 3 is an enlarged sectional view showing the resilient part 22 indicated with arrows III in FIG. 2. In FIGS. 2 and 3, the flexure 103 and rigid part 21 are fixed together at a joint spot X, the flexure 103 and a flexure attaching face 107 of the joint part 105 are fixed together at a joint spot Y, and the joint part 105 and base 12 are fixed together at a joint spot Z. The joint spot Y is separated away from the joint spot Z toward a disk, and therefore, the flexure 103 restricts movement of the resilient part 22. Namely, a gram load acting on a head 11 is not determinable only with the bending stress of the resilient part 22 but it is greatly influenced by the bending stress of the flexure 103.

In addition, due to temperature and humidity, the flexure 103 extends or contracts, and the elastic modulus thereof varies. If a proportion of the flexure 103 in the gram load is large, the gram load easily varies to raise a severe problem in designing the head suspension 101.

The related art mentioned above is disclosed in Japanese Unexamined Patent Application Publication No. 11-514780.

SUMMARY OF THE INVENTION

An object of the present invention is to solve the problem that a flexure of a head suspension for a hard disk drive has a large contribution rate with respect to a gram load acting on a head of the head suspension.

In order to accomplish the object, an aspect of the present invention provides a head suspension having a base attached to a carriage. The head suspension is provided with a flexure attaching face in the base side. The flexure attaching face is stepped away from the disk-side surface of a joint part of a load beam. A flexure is fixed to a rigid part of the load beam as well as to the flexure attaching face.

According to this aspect of the present invention, the head suspension has the flexure attaching face, in the base side, that is stepped away from the disk-side surface of the joint part of the load beam. The flexure is fixed to the rigid part as well as to the flexure attaching face. Without regard to the presence of the joint part of the load beam, the flexure is fixed to the flexure attaching face in the base side, so that a resilient part of the load beam may act as a simple support beam. This configuration can reduce the contribution rate of the flexure with respect to a gram load, i.e., the bending stress of a combination of the load beam and flexure.

BRIEF DESCRIPTION OF THE DRAWINGS

FIG. 14 is a table showing flexure contribution rates.

DETAILED DESCRIPTION OF EMBODIMENTS

Head suspensions according to embodiments of the present invention will be explained. Each of the head suspensions reduces the contribution rate of a flexure with respect to a gram load by adjusting a joint of the flexure with respect to a base.

First Embodiment

Figure 1:
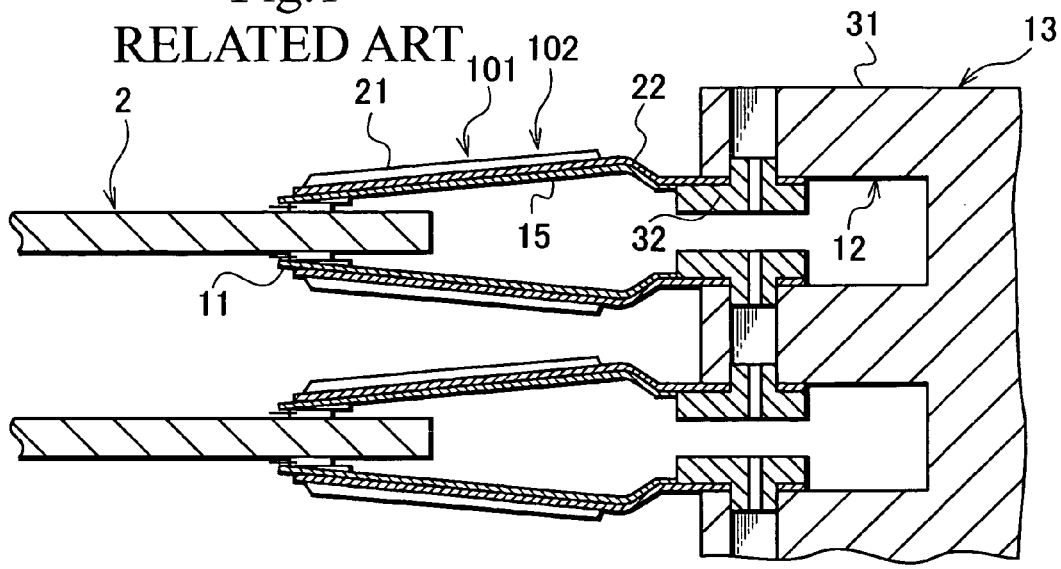
FIG. 1 is a sectional view showing a hard disk drive.
Figure 2:
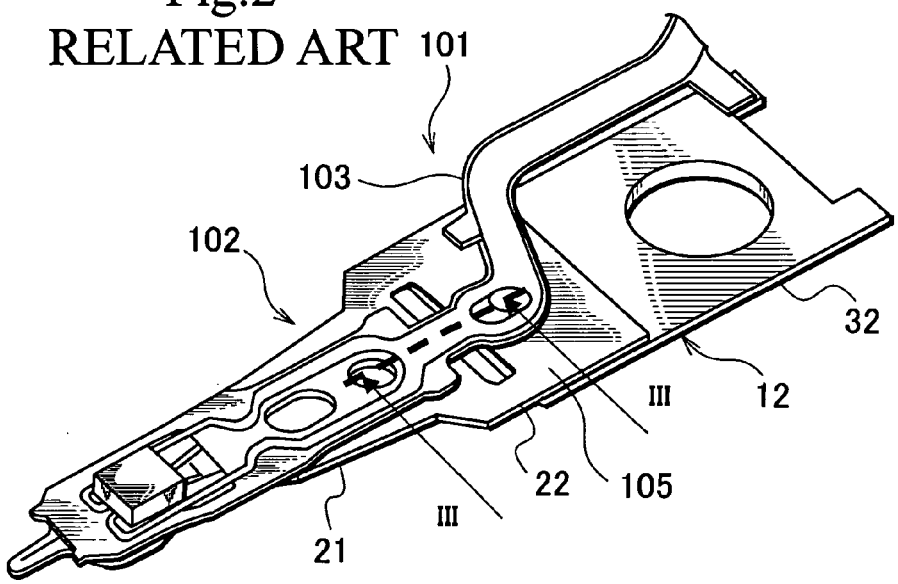
FIG. 2 is a perspective view showing a head suspension having a one-piece load beam according to a related art.
Figure 3:
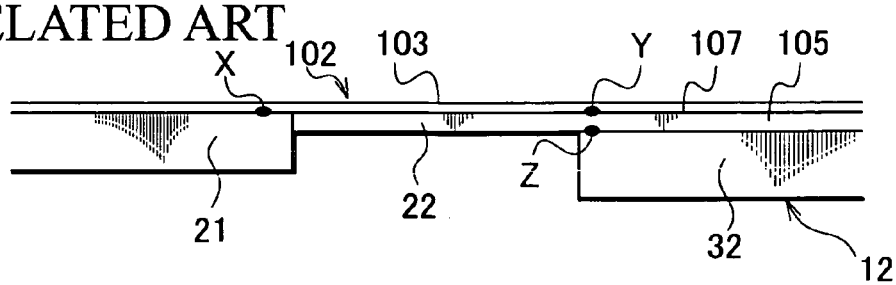
FIG. 3 is a view showing a part indicated with arrows III in FIG. 2.
Figure 4:
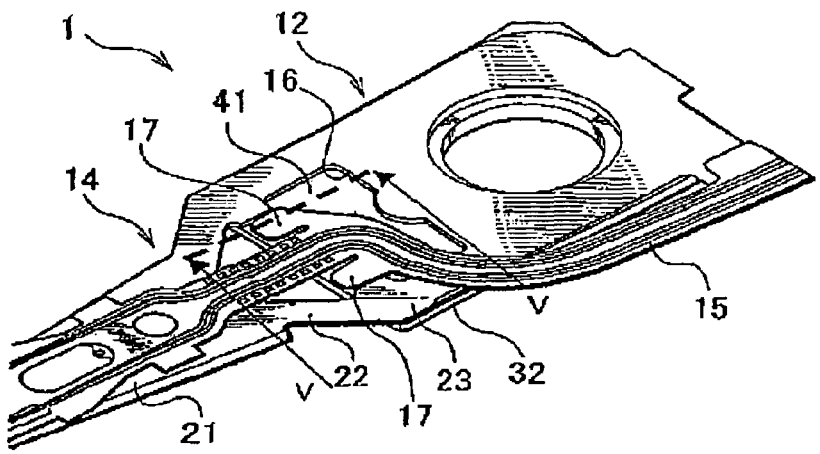
FIG. 4 is a perspective view showing a head suspension according to a first embodiment of the present invention.
Figure 5:
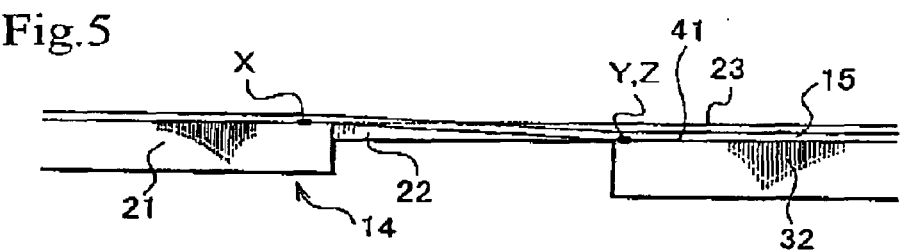
FIG. 5 is a view showing a part indicated with arrows V in FIG. 4.

FIGS. 4 and 5 show a head suspension 1 for a 2.5-inch hard disk drive according to the first embodiment of the present invention. FIG. 4 is a perspective view showing part around a resilient part 22 of a load beam 14 of the head suspension 1 and FIG. 5 is a sectional view showing a part indicated with arrows V in FIG. 4. In FIGS. 4 and 5, parts corresponding to those of FIGS. 1 to 3 are represented with like reference numerals.

In FIGS. 4 and 5, the head suspension 1 of the first embodiment includes a base 12, the load beam 14, and a flexure 15. The load beam 14 includes a rigid part 21, the resilient part 22, and a joint part 23. The resilient part 22 is made of a stainless steel plate of 51 μm thick. The rigid part 21 is made of the same stainless steel plate and has a high rigidity by box-bending to a height of 200 μm to 300 μm in a direction opposite to a disk. The joint part 23 is laid on a flat surface of a base plate 32 or the base 12 and fixed to a joint part fixing surface which is a part of the flat surface at joint spot Z by laser-welding. Therefore, the joint part 23 serves as a base side together with the base 12. The flexure 15 includes a stainless steel substrate of 20 μm thick, a wiring layer, and a resin layer. The total thickness of the flexure 15 is 43 μm. The flexure 15 has an extension 17 on each side edge. The extensions 17 are extended in an across-the-width direction of the flexure 15. The load beam 14 is cut off a portion of the joint part 23 adjacent to the resilient part 22 to form a hole 16. The hole 16 is extended from a first end of the joint part 23 to which the resilient part 22 is connected toward a second end opposite to the first end in the longitudinal direction of the load beam 14. The hole 16 exposes a partial area of the flat surface of a base plate 32 or the base 12 to define a flexure attaching face 41. Namely, the flexure attaching face 41 is recessed in the base 12 so that the flexure attaching face 41 is separated away from a disk-side surface of the joint part 23 of the load beam 14.

In the vicinity of the joint part 23, the extensions 17 and an adjacent body of the flexure 15 are arranged on the flexure attaching face 41 in the hole 16. Each extension 17 of the flexure 15 is laser-welded to the flexure attaching face 41 at a joint spot Y. Additionally, the adjacent body of the flexure 15 may be also laser-wedled to the flexure attaching face 41. The flexure 15 is fixed to the rigid part 21 of the load beam 14 at a joint spot X. Namely, the flexure 15 is fixed to the rigid part 21 and to the flexure attaching face 41 of the base plate 32.

The bending elastic modulus of a combination of the resilient part 22 and flexure 15 and the bending elastic modulus of the resilient part 22 without the flexure 15 are measured, to calculate a flexure contribution rate, i.e., the influence of the flexure 15 on the combinational bending elastic modulus. To verify the effect of the present invention, a table shown in FIG. 14 compares values measured on the head suspensions according to the present invention with values measured on the related art of FIG. 3 that laser-welds the load beam 14 and flexure 15 together without the flexure attaching face 41.

The flexure contribution rate is a percentage obtained by subtracting the bending elastic modulus of a resilient part from a combinational (resilient part plus flexure) bending elastic modulus to provide a difference (which may correspond to the bending elastic modulus of a flexure) and by dividing the difference by the combinational bending elastic modulus. In the table of FIG. 14, the flexure contribution rate of the related art is 34.3% and that of the first embodiment is 9.3%. In this way, the first embodiment can reduce the flexure contribution rate. This is because the first embodiment forms the joint spot Y where the flexure 15 is fixed to the flexure attaching face 41 and the joint spot Z where the joint part 23 is fixed to the base 12 on the same plane as shown in FIG. 5. Namely, without regard to the presence of the joint part 23 of the load beam 14, the first embodiment can fix the flexure 15 to the flexure attaching face 41, i.e., the base 12.

When a head 11 arranged at a front end of the load beam 14 lifts, the resilient part 22 bends in a direction opposite to a disk. At this time, the flexure 15 according to the first embodiment receives no unreasonable tension between the rigid part 21 and the base 12 and naturally bends in the direction opposite to a disk, thereby minimizing the contribution rate of the flexure 15 with respect to a gram load.

Hard disk drives are gradually reduced in size from those for server computers to those for desktop computers, notebook computers, and mobile computers. They must be further downsized when used for household appliances and cellular phones. A miniaturized hard disk drive needs small head suspensions. The small head suspensions involve light gram loads. To improve the shock property of a small head suspension involving a light gram load, a load beam of the head suspension must be lightweight. To reduce the weight of a load beam, the load beam must be thinned or must have a seamlessly integrated body including a rigid part (21), resilient part (22), and joint part (23) made of the same material. In this case, a flexure is laser-welded to the load beam and to a base like the related art shown in FIGS. 2 and 3, to increase a flexure contribution rate with respect to a gram load. A head suspension with a high flexure contribution rate hardly allows to compute a correct gram load and easily looses resilience. The first embodiment can solve these problems.

Second Embodiment

Figure 6:
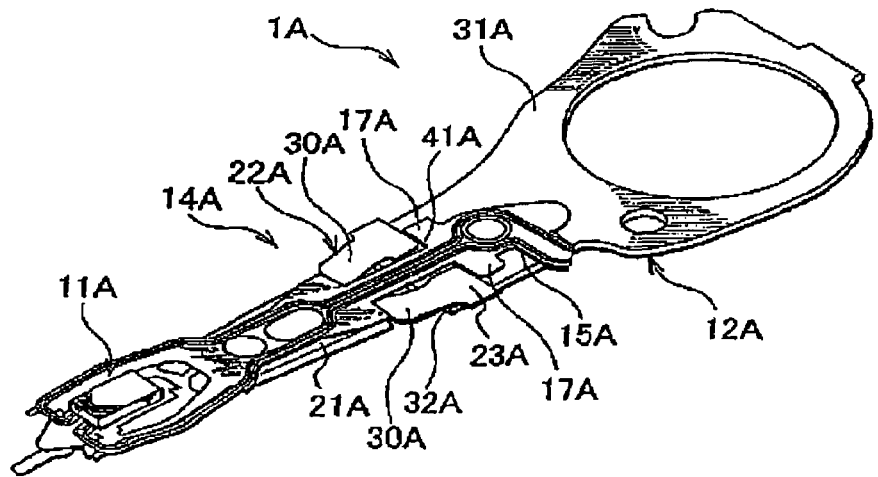
FIG. 6 is a perspective view showing a unamount (integrated) head suspension according to a second embodiment of the present invention.

FIG. 6 is a perspective view showing a head suspension 1A according to the second embodiment of the present invention. In FIG. 6, parts corresponding to those of FIGS. 1 to 3 are represented with like reference numerals with "A". This head suspension 1A is for a 1-inch hard disk drive and is of an unamount (integrated) type.

According to the second embodiment, a base plate 32A is integral with an arm 31A, to form a base 12A. The head suspension 1A has a load beam 14A and flexure 15A. The load beam 14A of the head suspension 1A is 30 μm thick. The load beam 14A includes a rigid part 21A, a resilient part 22A, and a joint part 23A. The rigid part 21A is box-bent to a height of 100 μm to 200 μm in a direction opposite to a disk. The resilient part 22A is formed from a pair of resilient plates 30A separated from the rigid part 21A. The resilient plates 30A are disposed along the side edge of the rigid part 21A to form a gap therebetween in an across-the-width direction of the load beam 14A. A first end of the resilient plate 30A is fixed to an end of the rigid part 21A. A second end of the resilient plate 30A is integrated with the joint part 23A fixed to an end of the base plate 32A.

The flexure 15A is extended from the rigid part side to the base side through the gap of the resilient part 22A. The flexure 15A has an extension 17A on each side edge. The thickness of the flexure 15A is the same as that of the first embodiment.

Like the first embodiment, the head suspension 1A of the second embodiment has a flexure attaching face 41A defined in a partial area of the flat surface of the base plate 32A to which the extension 17A of the flexure 15A is welded. The partial are is adjacent to the joint part 23A.

Therefore, weld spots are not adjacent to a resilient part 22A of the load beam 14A according to the second embodiment. In the table of FIG. 14, the second embodiment provides a flexure contribution rate of 8.9%.

Third Embodiment

Figure 7:
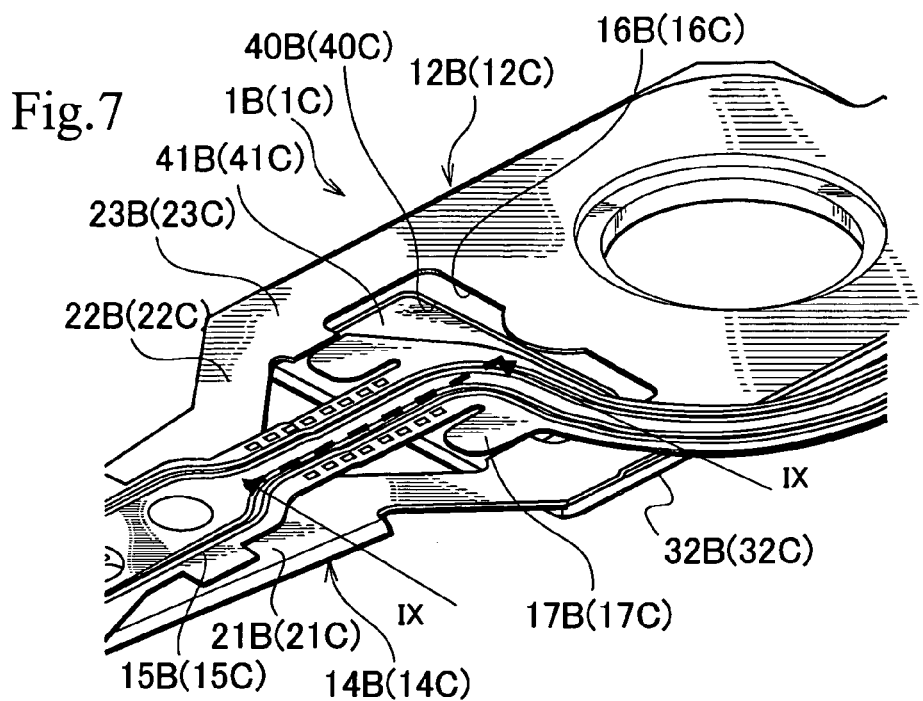
FIG. 7 is a perspective view showing a head suspension according to embodiments 3 and 4 of the present invention.
Figure 8:
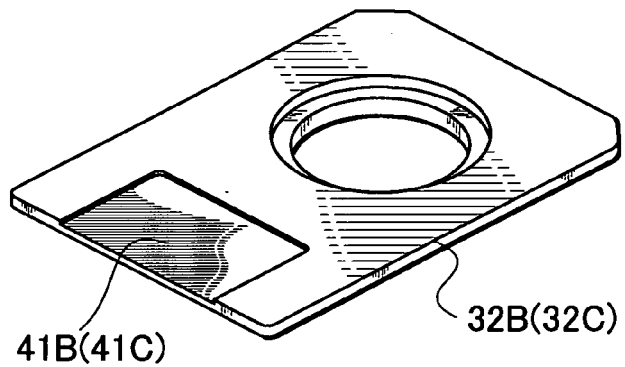
FIG. 8 is a perspective view showing a base plate of the head suspension of FIG. 7.
Figure 9:
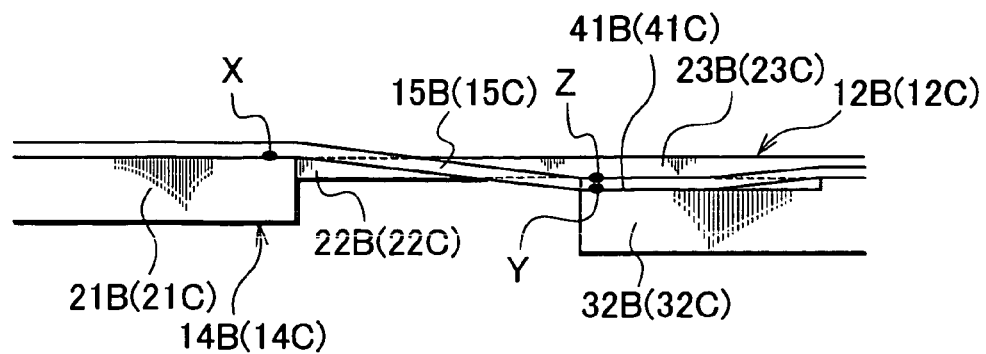
FIG. 9 is a view showing a part indicated with arrows IX in FIG. 7.

FIGS. 7, 8, and 9 show a head suspension 1B according to the third embodiment. The head suspension of a third embodiment has the same basic structure as the first embodiment. In FIGS. 7-9, therefore, parts corresponding to those of FIGS. 1 to 5 are represented with like reference numerals with "B". FIG. 7 is a perspective view mainly showing a resilient part 22B of a load beam 14B of the head suspension 1. FIG. 8 shows a base plate 32B having a flexure attaching face 41B. This head suspension 1B is for a 2.5-inch hard disk drive. The base plate 32B is fixed to a joint part 23B of the load beam 14B, and the flexure attaching face 41B is fixed to a flexure 15B. The flexure attaching face 41B is formed by partially etching the base plate 32B so that the flexure attaching face 41B is separated away from a disk. FIG. 9 is a sectional view showing a part indicated with arrows IX in FIG. 7.

The resilient part 22B according to the third embodiment is made of a stainless steel plate of 51 μm thick. The flexure 15B includes a stainless steel substrate of 20 μm thick, a wiring layer, and a resin layer. The total thickness of the flexure 15B is 43 μm. The load beam 14B is cut out a portion of the joint part 23B adjacent to the resilient part 22B to form a hole 16. The hole 16 exposes a partial area of the surface. The partial area of the surface has a recess 40B defining the flexure attaching face 41B. The recess 40B including the flexure attaching face 41B is formed by partially etching the surface of the base plate 32B by 20 μm that corresponds to the thickness of the stainless steel substrate of the flexure 15B. In the vicinity of the joint part 23B of the load beam 14B, the extensions 17B and an adjacent body of the flexure 15B are arranged on the flexure attaching face 41B in the recess 40B. Each extension 17B of the flexure 15B is laser-welded at a joint spot Y to the flexure attaching face 41B that is lower than the joint part 23B. The joint spot Y is adjacent to the resilient part 22B.

According to the third embodiment, the flexure attaching face 41B is formed in the base plate 32B (base 12B) and is separated away from a disk-side surface of the joint part 23B of the load beam 14B. The flexure 15B is fixed to a surface of the rigid part 21B of the load beam 14B at a joint spot X and to the flexure attaching face 41B of the base plate 32B at the joint spot Y.

In the table of FIG. 14, the third embodiment provides a flexure contribution rate of 6.1%. According to the third embodiment, the joint spot X between the flexure 15B and the rigid part 21B of the load beam 14B is on the surface of the load beam 14B, and the joint spot Y between the flexure 15B and the flexure attaching face 41B of the base 12B is lower than a joint spot Z where the joint part 23B of the load beam 14B is fixed to the base 12B. This configuration further decreases the flexure contribution rate.

Fourth Embodiment

A head suspension 1C of a fourth embodiment has the same basic structure as the third embodiment. Therefore, the head suspension 1C of a fourth embodiment will be explained with FIGS. 7-9 using reference numerals with "C" instead of "B" within a parenthesis.

The fourth embodiment further cuts the flexure attaching face 41B of the third embodiment by partial etching to a depth of 43 μm from the surface of the base plate 32C to form a recess 40C defining a flexure attaching face 41C. In this case, the flexure 15C is completely within the base 12C and is fixed thereto without no protruding from the surface of the base plate 32C. This configuration realizes a flexure contribution rate of 5.8% as shown in the table of FIG. 14. This rate is nearly equal to the bending elastic modulus of the flexure 15C alone.

Fifth Embodiment

Figure 10:
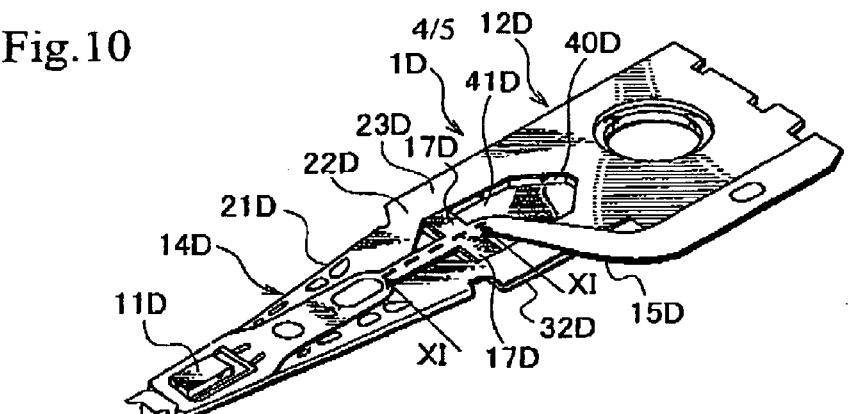
FIG. 10 is a perspective view showing a head suspension according to a fifth embodiment of the present invention.
Figure 11:
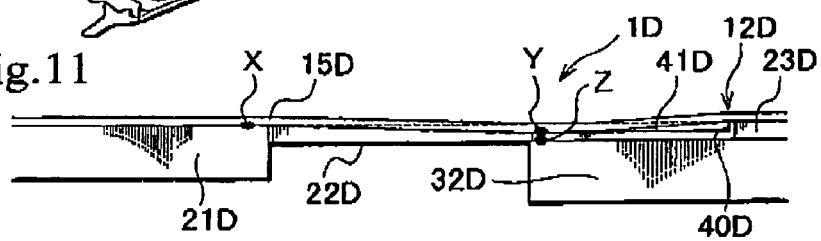
FIG. 11 is a view showing a part indicated with arrows XI in FIG. 10.

FIGS. 10 and 11 show a head suspension 1D according to the fifth embodiment of the present invention. The head suspension of a third embodiment has the same basic structure as the first embodiment. In FIGS. 10-11, parts corresponding to those of FIGS. 1 to 5 are represented with like reference numerals with "D". FIG. 10 is a perspective view showing the head suspension 1D and FIG. 11 is a sectional view showing a part indicated with arrows XI in FIG. 10.

This head suspension 1D is for a 2.5-inch hard disk drive. The head suspension 1D includes a base 12D, a load beam 14D, and a flexure 15D. The load beam 14D includes a rigid part 21D, a resilient part 22D, and a joint part 23D. The resilient part 22D is made of a stainless steel plate of 51 μm thick. The flexure 15D includes a stainless steel substrate of 20 μm thick, a wiring layer, and a resin layer. The total thickness of the flexure 15D is 43 μm. The flexure 15D has an extension 17D on each side edge. A surface of the joint part 23D of the load beam 14D is partially etched to a depth of 43 μm to form a recess 40D defining a flexure attaching face 41D. The depth 43 μm of the flexure attaching face 41D corresponds to the total thickness of the flexure 15D.

According to the fifth embodiment, the extensions 17D and an adjacent body of the flexure 15D are arranged on the flexure attaching face 41D in the recess 40D of the joint part 23 D. Each extension 17D of the flexure 15D is laser-welded to the flexure attaching face 41D at a joint spot Y. Namely, the flexure 15D is fixed to a surface of the rigid part 21D and to the flexure attaching face 41D.

Therefore, the flexure attaching face 41D is formed on the base 12D side and is spaced away from a disk-side surface of the joint part 23D in a direction opposite to a disk.

According to the fifth embodiment, a joint spot Y where the flexure 15D is fixed to the flexure attaching face 41D is separated from a joint spot Z where the joint part 23D of the load beam 14D is fixed to the base 12D by 8 μm compared with 51 μm of the related art. The fifth embodiment achieves a flexure contribution rate of 11.3% as shown in the table of FIG. 14.

Sixth Embodiment

Figure 12:
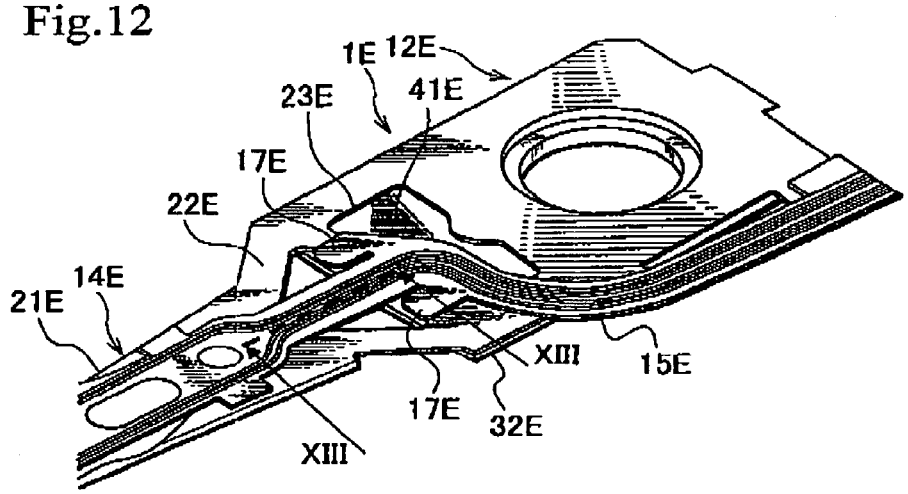
FIG. 12 is a perspective view showing a head suspension according to a sixth embodiment of the present invention.
Figure 13:
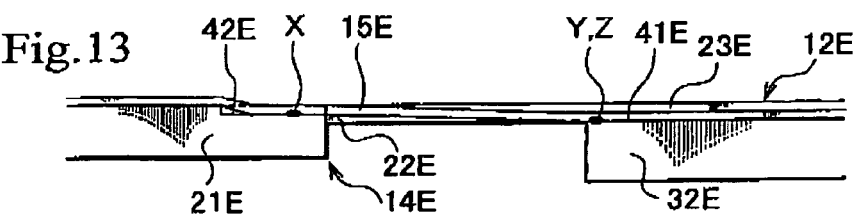
FIG. 13 is a view showing a part indicated with arrows XIII in FIG. 12.

FIGS. 12 and 13 show a head suspension 1E according to the sixth embodiment of the present invention. The head suspension of a third embodiment has the same basic structure as the first embodiment. In FIGS. 12 and 13, parts corresponding to those of FIGS. 1 to 5 are represented with like reference numerals or like reference numerals with "E". This head suspension 1E is for a 2.5-inch hard disk drive. FIG. 12 is a perspective view mainly showing a resilient part 22E of a load beam 14E of the head suspension 1 and FIG. 13 is a sectional view showing a part indicated with arrows XIII in FIG. 12.

The resilient part 22E of the load beam 14E is made of a stainless steel plate of 51 μm thick. A flexure 15E includes a stainless steel substrate of 20 μm thick, a wiring layer, and a resin layer. The flexure 15E has an extension 17E on each side edge. The total thickness of the flexure 15E is 43 μm. Like the first embodiment, the load beam 14E is cut out a portion of the joint part 23E adjacent to the resilient part 22E to form a hole 16E. The hole 16E exposes a partial area of the flat surface defining the flexure attaching face 41E.

A rigid part 21E of the load beam 14E has a second recess 44E formed by partially etching a portion of the rigid part 21E adjacent to the resilient part 22E by 20 μm. The recess 44E defines a second flexure attaching face 42E. To the second flexure attaching face 42E, the flexure 15E is laser-welded in the rigid part side. According to the sixth embodiment, a joint spot Y at which the flexure 15E is fixed to the flexure attaching face 41E and a joint spot Z at which a joint part 23E of the load beam 14E is fixed to the base 12E are on the same plane. A joint spot X at which the flexure 15E is fixed to the rigid part 21E is within the thickness of the load beam 14E. This configuration realizes a flexure contribution rate of 7.8% as shown in the table of FIG. 14.

What is claimed is:

1. A head suspension for a hard disk drive, comprising:
a base including a base plate attached to a carriage of the hard disk drive and turned around a spindle of the carriage, the base plate including a spindle aperture for accepting the spindle;
a load beam having a rigid pan, a resilient part, and a joint part forming a seamlessly, integrated body with the resilient part, the joint part having a first joint part surface laid in contact with and fixed to a base plate surface of the base plate, a second joint part surface opposing said first joint part surface;
the base plate having a base plate edge facing the rigid part and the joint part extending from the base plate edge to a position on said base plate encompassing at least a portion of the spindle aperture of the base plate to form the base together with the base plate;
the load beam having a front end distal the base plate and a rear end proximate the base plate, the resilient part being connected to the rear end of the base plate;
a head for writing and reading data to and from a disk arranged in the hard disk drive, the head being arranged at the front end of the load beam and receiving a load from the load beam;
a flexure having read/write wires connected to the head and supporting the head on a first flexure side of the flexure oriented in and defining a disk facing direction, the flexure being attached via a second flexure side to a disk-side surface of the rigid part of the load beam supporting the head, the second flexure side opposing said first flexure side, and the flexure extending along the rigid part, along the resilient part, and onto the base plate;
the base plate having a flexure attaching face adjacent the base plate edge and oriented in the disk facing direction, the flexure attaching face being stepped away from a plane of the second joint part surface in a direction opposite to the disk facing direction so as to be recessed relative to the second joint part surface, said second joint part surface being coplanar with the disk-side surface of the rigid part; and
the flexure having the second flexure side fixed to a surface of the rigid part and in contact with and fixed to the flexure attaching face.

2. The head suspension of claim 1, wherein the flexure attaching face is a partial area of the base plate surface of the base plate.

3. The head suspension of claim 2, wherein the surface of the base plate is a flat surface including the partial area and a joint part fixing surface of the base plate surface to which the joint pan is fixed.

4. The head suspension of claim 2, wherein:
the flexure attaching face is adjacent to the resilient part.

5. The head suspension of claim 2, wherein the partial area is stepped away from a joint part fixing surface of the base plate to which the joint part is fixed in the direction opposite to the disk.

6. The head suspension of claim 5, wherein:
the flexure attaching face is adjacent to the resilient part.

7. The head suspension of claim 6, further comprising:
a second flexure attaching face formed in the disk-side surface of the rigid part, the second flexure attaching face being stepped away from the disk-side surface of the rigid part in the direction opposite to the disk facing direction and being adjacent to the resilient part.

8. The head suspension of claim 7, wherein:
the second flexure attaching race is formed by partial etching.

9. The head suspension of claim 5, further comprising:
a second flexure attaching face formed in the disk-side surface of the rigid part, the second flexure attaching race being stepped away from the disk-side surface of the rigid part in the direction opposite to the disk facing direction and being adjacent to the resilient part.

10. The head suspension of claim 9, wherein:
the second flexure attaching face is formed by partial etching.

11. The head suspension of claim 5, wherein:
the flexure attaching face is formed by partial etching.

12. The head suspension of claim 2, wherein:
the flexure attaching face is adjacent to the resilient part.

13. The head suspension of claim 12, further comprising:
a second flexure attaching face formed in the disk-sick surface of the rigid part, the second flexure attaching race being stepped away from the disk-side surface or the rigid part in the direction opposite to the disk facing direction and being adjacent to the resilient part.

14. The head suspension of claim 13, wherein:
the second flexure attaching face is formed by partial etching.

15. The head suspension of claim 2, further comprising:
a second flexure attaching face formed in the disk-side surface of the rigid part, the second flexure attaching race being stepped away from the disk-side surface of the rigid part in the direction opposite to the disk facing direction and being adjacent to the resilient.

16. The head suspension of claim 15, wherein:
the second flexure attaching face is formed by partial etching.

17. The head suspension of claim 1, wherein:
the flexure attaching face is adjacent to the resilient part.

18. The head suspension of claim 17, further comprising:
a second flexure attaching face formed in the disk-side surface of the rigid part, the second flexure attaching face being stepped away from the disk-side surface of the rigid part in the direction opposite to the disk facing direction and being adjacent to the resilient part.

19. The head suspension of claim 18, wherein:
to second flexure attaching face is formed by partial etching.

20. The head suspension at claim 1, further comprising:
a second flexure attaching face formed in the disk-side surface of the rigid part, the second flexure attaching face being stopped away from the disk-side surface of the rigid part in the direction opposite to the disk facing direction and being adjacent to the resilient part.

21. The head suspension of claim 20, wherein:
the second flexure attaching face is formed by partial etching.

22. The head suspension of claim 1, wherein:
the flexure attaching face is formed by partial etching.

* * * * *